US006988159B2

(12) United States Patent
Gebara et al.

(10) Patent No.: US 6,988,159 B2
(45) Date of Patent: Jan. 17, 2006

(54) CABLELESS EMBEDDED SIMPLEX/DUPLEX CHANNEL SCSI IMPLEMENTATION

(75) Inventors: Ghassan Gebara, Spring, TX (US); Madhavkumar Chandran, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/629,051

(22) Filed: Jul. 29, 2003

(65) Prior Publication Data

US 2005/0027916 A1 Feb. 3, 2005

(51) Int. Cl.
*G06F 13/00* (2006.01)
*G06F 13/14* (2006.01)
*G06F 9/00* (2006.01)

(52) U.S. Cl. ........................................ 710/305; 710/14

(58) Field of Classification Search ................. 710/14, 710/314, 300–304, 105, 62, 72, 305, 316; 712/30, 32; 370/257, 276, 454; 709/253; 711/112; 326/30

See application file for complete search history.

(56) References Cited

U.S. PATENT DOCUMENTS 5,603,044 A * 2/1997 Annapareddy et al. ..... 710/301
6,055,582 A * 4/2000 Pascarella et al. ............ 710/14
6,606,656 B2 * 8/2003 Carvey et al. .............. 709/220
6,901,458 B2 * 5/2005 Vuong ......................... 710/14

OTHER PUBLICATIONS

"Design advances in PCB/backplane interconnects for the propagation of high speed Gb/s digital signals"by Gisin et al. (abstract only) Publication Date: 1-3 Oct. 2003.*

* cited by examiner

*Primary Examiner*—Gopal C. Ray

(57) ABSTRACT

A small computer system interface (SCSI) system and methods of configuring/operating the SCSI system without cables. The SCSI system includes a system board, a backplane, and a cableless element configured to couple the system board to the backplane. The system board comprises an embedded SCSI controller configured to provide cableless control in each of a simplex mode of operation and a duplex mode of operation. The backplane comprises a plurality of connectors configured to couple SCSI devices to the backplane. The cableless element is configured to facilitate the exchange of control signals and power signals between the system board and the backplane in each of the simplex mode of operation and the duplex mode of operation, thereby providing a cableless embedded simplex/duplex SCSI system.

23 Claims, 8 Drawing Sheets

CABLELESS EMBEDDED SIMPLEX/DUPLEX CHANNEL SCSI IMPLEMENTATION

BACKGROUND

This section is intended to introduce the reader to various aspects of art which may be related to various embodiments of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Small Computer System Interface (SCSI) is a widely used communications protocol standard from the American National Standards Institute (ANSI) for interconnecting computers and other input/output devices. A SCSI board or "backplane" may be coupled to the system board through the expansion slots and one or more cables. The SCSI backplane provides drive connectors into which drives or other peripheral devices may be plugged.

SCSI backplanes may be configured to support either or both of a SCSI simplex mode or SCSI duplex mode. While configuring a SCSI backplane of a computer system to operate in both the simplex and duplex modes of operation may provide system flexibility, current techniques for transitioning between modes may be tedious.

BRIEF SUMMARY

In accordance with one embodiment of the present invention, there is provided a system comprising: a system board comprising an embedded small computer system interface (SCSI) controller configured to provide cableless control in each of a simplex mode of operation and a duplex mode of operation and wherein the system board comprises a first channel bus and a second channel bus; a backplane comprising a plurality of connectors configured to couple SCSI devices to the backplane; and a cableless element configured to couple the backplane to the system board and configured to facilitate the exchange of control signals and power signals in each of the simplex mode of operation and the duplex mode of operation.

In accordance with another embodiment of the present invention, there is provided a system comprising: a small computer system interface (SCSI) system comprising a first bus channel and a second bus channel, wherein the SCSI system is configured to operate in each of a selectable simplex mode and a duplex mode without implementing cables, and wherein the SCSI system is configured to implement each of a selectable embedded SCSI controller and one or more external SCSI controllers; and one or more SCSI devices coupled to the SCSI system.

In accordance with yet another embodiment of the present invention, there is provided a system for implementing a simplex mode of operation and a duplex mode of operation, the system comprising: a first small computer system interface (SCSI) channel comprising a first bus, wherein the first bus is coupled between an embedded SCSI controller on a system board and a first external control connector on a backplane; a second small computer system interface (SCSI) channel comprising a second bus, wherein the second bus is coupled between the embedded SCSI controller on the system board and a second external control connector on a backplane; and wherein the backplane is coupled to the system board through a cableless element.

In accordance with still another embodiment of the present invention, there is provided a method comprising: selecting one of a simplex mode of operation and a duplex mode of operation in a small computer system interface (SCSI) system, wherein the SCSI system comprises a backplane coupled to a system board through a single cableless element; and configuring each of a first bus and a second bus in the SCSI system based on the selected mode of operation, wherein the first bus is coupled to one or more first SCSI devices and wherein the second bus is coupled to one or more second SCSI devices.

BRIEF DESCRIPTION OF THE DRAWINGS

Advantages of embodiments of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
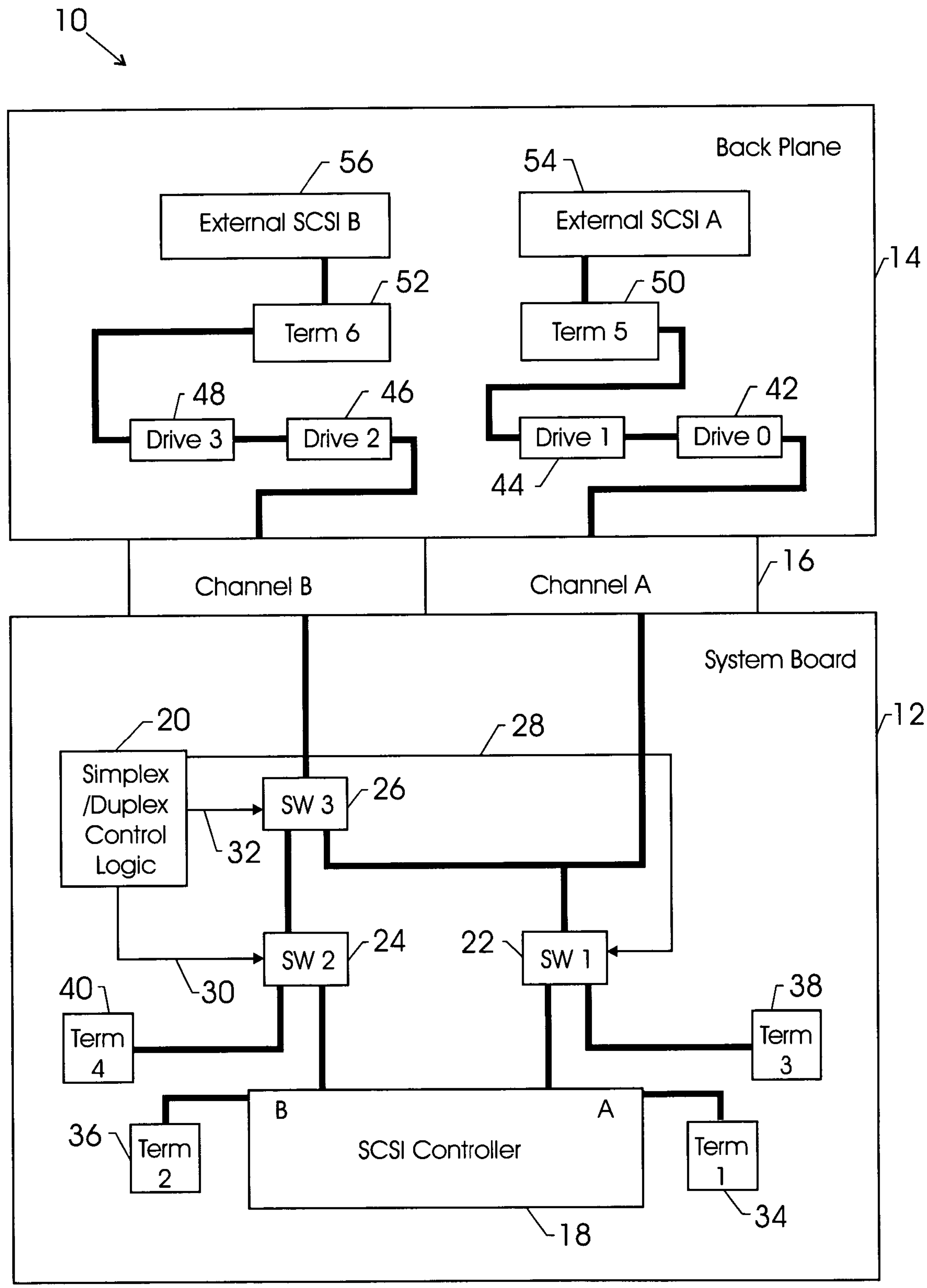
FIG. 1 is a block diagram illustrating a cableless simplex/duplex channel SCSI topology according to embodiments of the present invention.

Referring now to the drawings, FIG. 1 is a block diagram illustrating a cableless simplex/duplex SCSI topology according to embodiments of the present invention. As will be appreciated, the present exemplary configuration provides a number of alternative implementations of the presently described system. A number of alternative configurations will be described below with reference to FIGS. 2–8. Accordingly, the exemplary system topology will initially be described with reference to FIG. 1. Like reference numerals are used to describe like elements.

The presently described topology permits single channel (simplex mode) or dual channel (duplex mode) operation for a system implementing a SCSI protocol, a cableless connection between the backplane and the system board, wherein the mode of operation can be changed remotely without modifying the system hardware. Advantageously, in accordance with the presently described embodiments, transitioning between modes can be achieved without a significant amount of tedious disassembly of a system housing, board replacement and/or manual cable switching by a user. The reduction in disassembly saves time and money and reduces the likelihood of user errors. Further, by using a cableless element to electrically couple a SCSI backplane to the system board may be reliability may be increased and associated cabling costs and the potential for cable mishandling are eliminated. Still further, the present system provides user flexibility by permitting embedded control or external control of the channel selection.

Cableless Simplex/Duplex Channel SCSI Topology

Referring initially to FIG. 1, a portion of an exemplary system 10, such as a computer system, is illustrated. The system 10 includes a system board 12 and a backplane 14. As can be appreciated, the backplane 14 is an option board that is electrically coupled to the system board 12. In accordance with the present exemplary embodiment, the backplane 14 is coupled directly to the system board 12 without implementing cables. In the present exemplary embodiment, the backplane 14 is coupled to the system board 12 via a board-to-board connector 16. As will be described further below, the connector 16 includes enough pins to support two SCSI channels (Channel A and Channel B), including the power signals for each of the channels. Accordingly, no cables are implemented to couple the backplane 14 to the system board 12 or to provide power signals to the backplane 14. In one exemplary embodiment, the board-to-board 16 connector comprises a 200-pin connector.

The system board 12 includes a SCSI controller 18 to control the buses and the drives and peripheral devices that may be coupled to the buses through the backplane 14. While a single SCSI controller 18 is illustrated, it should be understood that a separate controller may be implemented for each channel. Accordingly, the SCSI controller 18 may comprise a first controller for channel A and a second controller for channel B. The system board 12 also includes control logic 20 to control the cableless switching between the simplex and duplex modes of operation when implementing embedded control or external control. As used herein, "embedded control" refers to implementing one or more controllers, such as the SCSI controller 18, on the system board, to control the SCSI buses and access to the devices coupled to those buses. As will be described below, the system 10 also allows for external control of the SCSI buses. When one or more external controllers are implemented, the SCSI controller 18 is electrically isolated from the externally controlled bus(es) by the control logic 20. The control logic 20 may be provided on a suitable non-volatile memory chip that may be programmed for switching control, such as a programmable array logic (PAL) device. When implementing embedded control, the control logic 20 receives a command from a user indicating whether a simplex or duplex mode of operation will be implemented, and the control logic 20 configures the topology in accordance with the command.

To configure the topology in accordance with the desired mode of operation, the control logic is coupled to a set of bus switches 22, 24 and 26. In the present exemplary embodiment, the bus switches 22, 24 and 26 comprise electronic bi-directional switches having low skew, low propagation delay and low capacitive loading. Advantageously, these switches are easily controlled and minimally intrusive on the SCSI buses, as can be appreciated. Each of the switches 22, 24 and 26 includes three terminals, thereby enabling switching of the SCSI bus paths. For instance, when the switch 22, 24 or 26 is in a first state, a first bus path is connected and the second bus path is disconnected. When the switch 22, 24 or 26 is in a second state, the first bus path is disconnected and the second bus path is connected. Further, the switch 22, 24 or 26 may be in an open state wherein each of the first bus path and the second bus path may be disconnected.

As will be described further with reference to FIGS. 2–8, the state of the bus switches 22, 24 and 26 may be controlled in accordance with a command from the control logic 20 to facilitate the use of either a single channel (simplex mode) or both channels (duplex mode), when implementing either embedded control of both channels, external control of both channels or embedded control of one channel and external control of the other. Accordingly, the control logic 20 is electrically coupled to each of the bus switches 22, 24 and 26 through a respective switch control path 28, 30 and 32. The control logic 20 sets the state of the bus switches 22, 24 and 26 by sending a state signal to the bus switch 22, 24 and 26, through the respective switch control path 28, 30 and 32.

As will be appreciated, segments of both channels (A and B) may be implemented when the system is operating in a simplex mode. Accordingly, it should be understood that references to a simplex mode refer to a single controller or single controller segment (embedded or external) controlling each of the SCSI devices supported by the system 10. References to a duplex mode indicate isolation of the channels (A and B) and isolated control of each of the channels by two controllers or two controller segments (embedded or external). The implementation of each channel or segments of each channel will be described further below with reference to FIGS. 2–8.

The system board 12 also includes a number of SCSI terminators 34, 36, 38 and 40. As can be appreciated, to preserve signal integrity on a SCSI bus, it may be advantageous to properly terminate the SCSI bus when the channel is in use. When a terminator 34, 36, 38 and 40 is enabled, it provides proper termination for the SCSI bus. When the terminator 34, 36, 38 and 40 is disabled, no termination for the SCSI bus is provided. Because the present exemplary system 10 permits operation in each of the simplex and duplex mode, the terminators 34, 36, 38 and 40 are enabled and disabled by the control logic 20 in accordance with the selected mode of operation such that the SCSI buses are properly terminated. The implementation of the terminators 34, 36, 38 and 40 will be described further below with reference to FIGS. 2–8.

To implement SCSI devices in the system 10, a backplane 14 is provided. The backplane 14 receives a number of power signals, such as 12V, 5V and 3.3V power signals, from the system board 12 through the board-to-board connector 16. The backplane 14 includes a number of drive connectors 42, 44, 46 and 48. Each drive connector 42, 44, 46 and 48 may be implemented to couple devices, such as hard disk drives, to the backplane 14 for implementation in the system 10. While four drive connectors 42, 44, 46 and 48 are illustrated in the present exemplary embodiment, it should be understood that any number of drive connectors (and thus SCSI devices) that may be incorporated in accordance with the SCSI protocol may be implemented in the exemplary topologies.

As described further below, any SCSI devices coupled to the drive connectors 42, 44, 46 and 48 may be implemented in either of the simplex or duplex modes of operation. In one exemplary embodiment, the drive connectors 42, 44, 46 and 48 may comprise hot plug connectors that may be implemented to connect SCSI devices, such as disk drives, while the system 10 is powered-on. The backplane 14 further includes SCSI terminators 50 and 52 that may be implemented to terminate the SCSI buses, as described above and described further below with reference to FIGS. 2–8.

In one exemplary embodiment of the system 10, the backplane 14 also includes external control connectors 54 and 56. The external control connectors may comprise 68-pin SCSI connectors, for instance. It may be advantageous to control the devices coupled to the SCSI buses (i.e., the devices coupled to the backplane 14 through the drive connectors 42, 44, 46 and 48) through one or more external controllers. Accordingly, external control connectors 54 and 56 provide signal paths to implement external control of the SCSI devices. External control may be provided by one or more peripheral control interconnect (PCI) array controllers, for instance. As described further below, if external controllers are implemented, the embedded SCSI controller 18 is electrically isolated by the embedded control logic 20.

Turning now to FIGS. 2–8, alternate exemplary implementations of the present system 10 are described. As described above, the system 10 may be implemented in a simplex mode of operation or a duplex mode of operation. Further, the system 10 may implement embedded SCSI control or external SCSI control. FIGS. 2–8 describe these exemplary implementations. Accordingly, like reference numerals are used to describe those elements previously described with reference to FIG. 1. Further, for illustrative purposes, thickened lines are used to depict buses and devices that are enabled or connected with respect to each respectively described implementation, while dashed lines are implemented to depict buses and devices that are disabled or disconnected with respect to each respectively described implementation.

Cableless Simplex Topology Driven by an Embedded Controller

Figure 2:
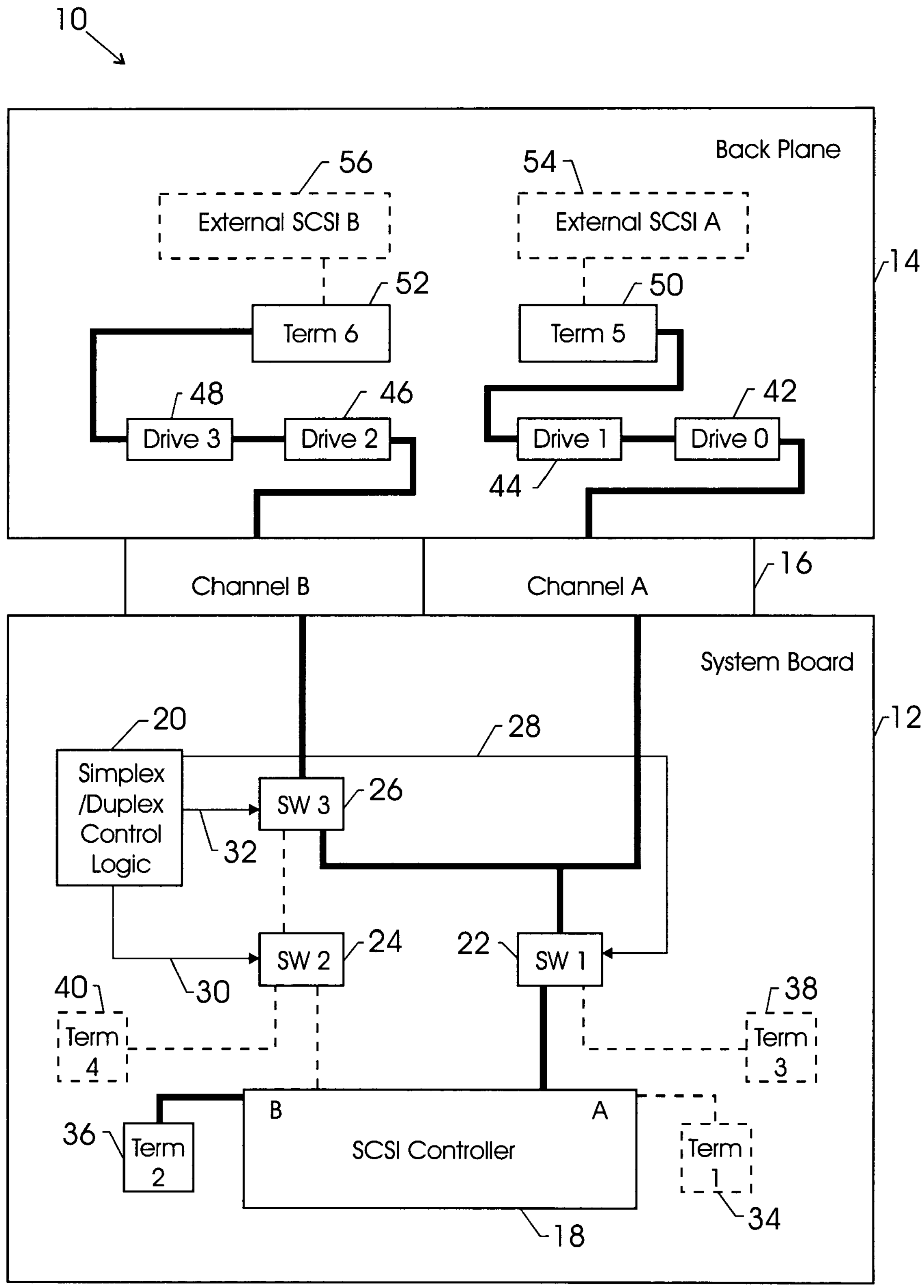
FIG. 2 is a block diagram illustrating an exemplary cableless simplex topology driven by an embedded controller according to embodiments of the present invention.

Referring now to FIG. 2, a block diagram of an exemplary topology for a SCSI simplex mode of operation driven by the embedded SCSI controller 18 is illustrated. Each of the drive connectors 42, 44, 46 and 48 has a SCSI device (not shown), such as a disk drive, coupled thereto. To implement each of the SCSI devices coupled to the drive connectors 42, 44, 46 and 48 in a simplex mode, channel B on the system board 16 is essentially disabled. That is to say that the SCSI controller 18 is disconnected or electrically isolated from channel B. As discussed further below, channel A remains connected to the SCSI controller 18.

To isolate channel B, the control logic 20 sets the bus switch 24 to an "open state." As can be appreciated, each bus switch 22, 24 and 26 may be set to a "first state," a "second state" or an "open state." As used herein, the first state indicates connection of a first signal path and disconnection of a second signal path. The second state indicates connection of the second signal path and disconnection of the first signal path. The open state indicates the disconnection of both signal paths. Accordingly, by opening the bus switch 24, the SCSI controller 18 is electrically isolated from the SCSI devices through channel B, and control of the SCSI devices is implemented by the SCSI controller 18 through channel A, exclusively. Accordingly, the bus switch 22 is set by the control logic 20 to a first state, thereby providing a bus path on channel A from the SCSI controller 18 to the SCSI devices coupled to the drive connectors 42 and 44. As used herein, setting a bus switch 22, 24 or 26 to a "first state" indicates that the left bus path (in accordance with the Figures) is closed (i.e. connected), and the right bus path is opened (i.e. disconnected). Similarly, setting a bus switch to a "second state" indicates that the right bus path is closed (i.e. connected), and the left bus path is opened (i.e. disconnected). The bus switch 26 is set to a second state to connect the devices coupled to the drive connectors 46 and 48 to the SCSI bus on channel A. This configuration enables the SCSI controller 18 to control the devices coupled to each of the drive connectors through a single channel.

Accordingly, in the simplex mode, the SCSI controller 18 provides control of each of the four SCSI devices coupled to the drive connectors 42, 44, 46 and 48 through a single, SCSI bus (here, channel A). By configuring the bus switches 22, 24 and 26 in accordance with the present exemplary topology, segments of each of the channels are connected to form a single bus (indicated by the thickened lines in FIG. 2), wherein control of the SCSI devices is provided through channel A. As can be appreciated when the present system 10 is implemented in a simplex mode wherein the SCSI channels are driven by an embedded controller 18, as in FIG. 2, the disclosed topology allows for the SCSI devices coupled to the drive connectors 42, 44, 46 and 48 to be driven from the middle of the bus, rather than from the end of the bus.

As previously described, each end of the SCSI bus should be terminated. As can be appreciated, although a channel (here, channel B) may be disconnected during operation, the disconnected SCSI bus is still active. Without proper termination, the disconnected SCSI bus remains floating. Accordingly, in the embodiment illustrated in FIG. 2, one end of the SCSI bus on channel B of the embedded controller 18 is terminated by enabling terminator 36. In the present exemplary configuration, terminators 34, 38 and 40 are not implemented and are therefore disabled. Because embedded control of the SCSI devices is being implemented (i.e., control by the SCSI controller 18), the external control connectors 54 and 56 are illustrated as disabled. That is to say that there are no devices coupled to the external control connectors 54 and 56. Accordingly, to terminate the ends of the SCSI bus on the backplane 14, each of the terminators 50 and 52 is enabled. As can be appreciated, the topology illustrated in FIG. 2 provides for embedded control of the SCSI devices in a simplex mode of operation.

Cableless Duplex Topology Driven by an Embedded Controller

Figure 3:
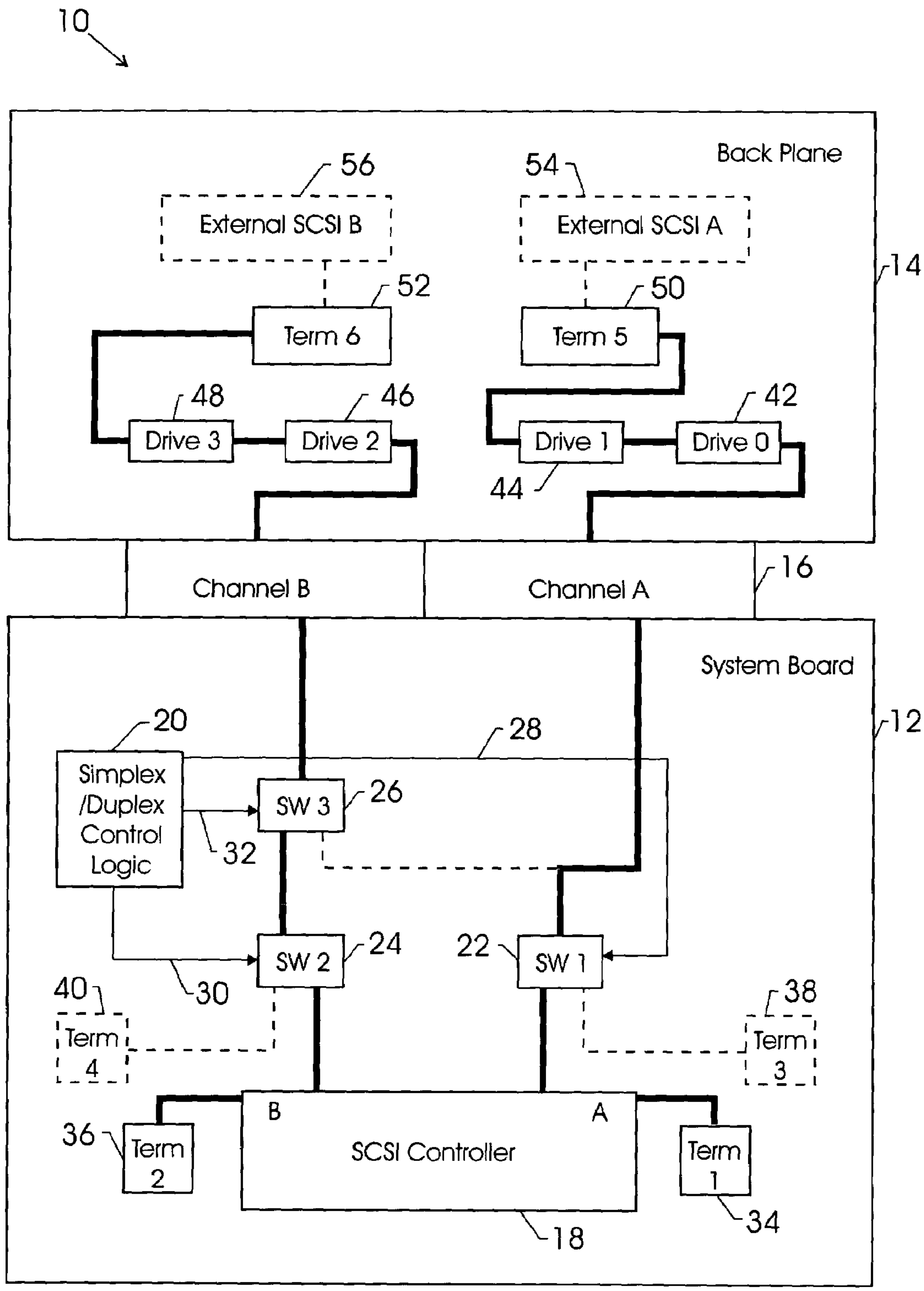
FIG. 3 is a block diagram illustrating an exemplary cableless duplex topology driven by an embedded controller in accordance with embodiments of the present invention.

Referring to FIG. 3, a block diagram of an exemplary topology for a SCSI duplex mode of operation driven by an embedded SCSI controller 18 is illustrated. To implement each of the SCSI devices (not shown) coupled to the drive connectors 42, 44, 46 and 48 in a duplex mode, both channels (A and B) on the system board 16 are enabled. The SCSI devices coupled to the drive connectors 42 and 44 are controlled by the SCSI controller 18 through channel A, and the SCSI devices coupled to the drive connectors 46 and 48 are controlled by the SCSI controller 18 through channel B. Accordingly, the bus switch 22 is set by the control logic 20 to a first state, thereby providing a bus path from the SCSI controller 18 to the SCSI devices coupled to the drive connectors 42 and 44. The bus switch 24 is set to a second state such that the SCSI controller 18 is coupled to the SCSI devices coupled to the drive connectors 46 and 48. The bus switch 26 is set to a first state thereby isolating each of the SCSI buses from one another.

In the present exemplary configuration, terminators 38 and 40 are not implemented and are therefore disabled. To terminate one end of the SCSI bus for channel A, terminator 34 is enabled. To terminate one end of the SCSI bus for channel B, terminator 36 is enabled. Because embedded control of the SCSI devices is being implemented, the external control connectors 54 and 56 are illustrated as disabled. That is to say that there are no devices coupled to the external control connectors 54 and 56. Accordingly, to terminate the second end of each of the SCSI buses, each of the terminators 50 and 52 is enabled. As can be appreciated, the topology illustrated in FIG. 3 provides for embedded control of the SCSI devices in a duplex mode of operation.

Figure 4:
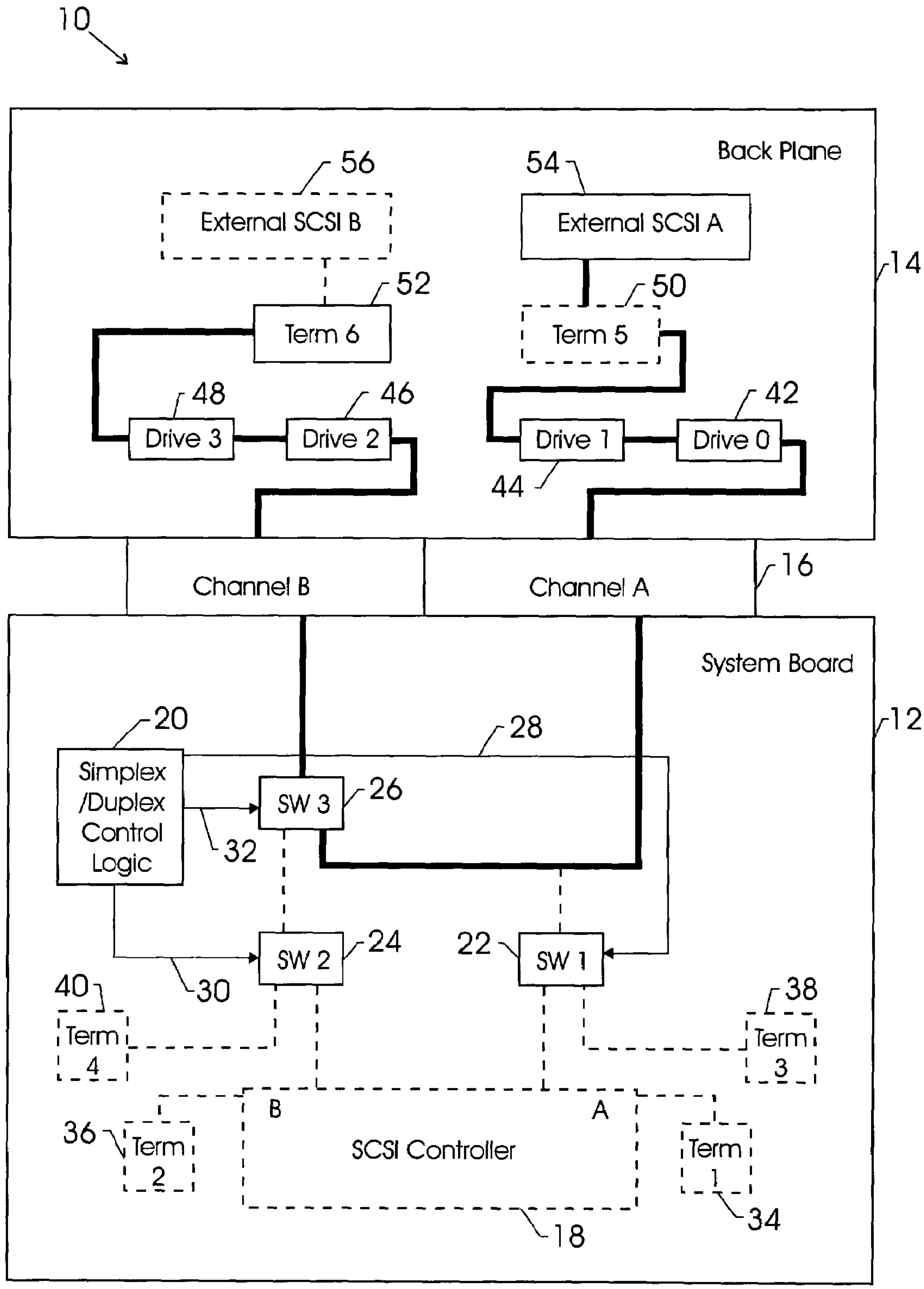
FIG. 4 is a block diagram illustrating an exemplary cableless simplex topology driven by an external controller coupled to a first channel in accordance with embodiments of the present invention.

Cableless Simplex Topology Driven by an External Controller Coupled to Channel A Referring now to FIG. 4, a block diagram of an exemplary topology for implementing a SCSI simplex mode of operation driven by an external SCSI controller (not shown) is illustrated. In the present exemplary embodiment, an external controller is coupled to the external control connector 54 to provide SCSI control. To implement external control, the SCSI controller 18 is electrically isolated from the channels by the external controller and the bus switches 22, 24 and 26. When a device is coupled to the external control connector 54, a control signal is delivered from the external controller through the board-to-board connector 16 to disconnect the embedded SCSI controller 18. Control of the bus switches 22, 24 and 26, as well as the terminators 34, 36, 38, 40, 50 and 52, is provided by the control logic 20.

As previously described, each of the drive connectors 42, 44, 46 and 48 has a SCSI device (not shown), such as a disk drive, coupled thereto. To implement each of the SCSI devices coupled to the drive connectors 42, 44, 46 and 48 under external control in a simplex mode, the embedded controller 18 is electrically isolated from the buses. To electrically isolate the embedded controller 18, the external control logic sets the bus switches 22 and 24 to an open state. By opening the bus switches 22 and 24, the buses to the SCSI controller 18 are disconnected, and control of the SCSI devices is implemented through the external control connector 54 and on channel A, exclusively. The bus switch 26 is set to a second state to connect the devices coupled to the drive connectors 46 and 48 to the SCSI bus on channel A. This configuration enables the external controller coupled to the external control connector 54 to control the devices coupled to each of the drive connectors on a single bus and through a single channel. Accordingly, in the simplex mode, the external SCSI controller provides control of each of the four SCSI devices coupled to the drive connectors 42, 44, 46 and 48 through a single SCSI bus coupled to an external controller on a single channel (here, channel A).

As previously described, each end of the SCSI bus should be terminated. Accordingly, one end of the SCSI bus is terminated by enabling terminator 52 at the end of the single bus path. In the present exemplary configuration, terminators 34, 36, 38 and 40 are not implemented and are therefore disabled. The terminator 50 is also disabled such that the path to the external control connector 54 is open for control signals. As can be appreciated, the other end of the SCSI bus may be terminated externally. Because the present embodiment implements a simplex mode and a single external controller coupled to the external control connector 54, the external control connector 56 is illustrated as disabled. That is to say that there are no devices coupled to the external control connector 56. As can be appreciated, the topology illustrated in FIG. 4 provides for external control of the SCSI devices in a simplex mode of operation through a controller on channel A.

Figure 5:
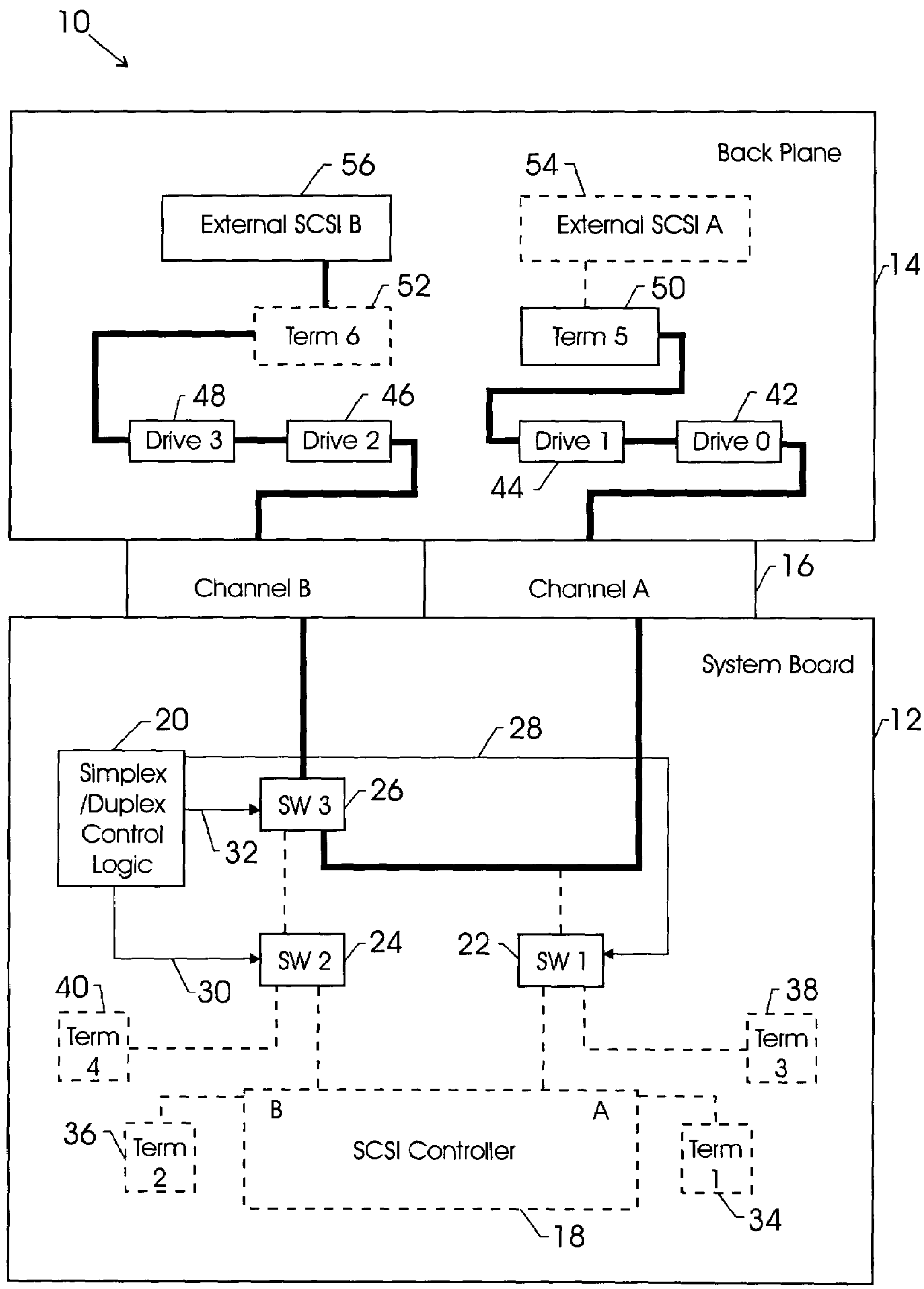
FIG. 5 is a block diagram illustrating an exemplary cableless simplex topology driven by an external controller coupled to a second channel in accordance with embodiments of the present invention.

Cableless Simplex Topology Driven by an External Controller Coupled to Channel B Referring now to FIG. 5, a block diagram of an alternate exemplary topology for implementing a SCSI simplex mode of operation driven by an external SCSI controller (not shown) is illustrated. In the present exemplary embodiment, an external controller (not shown) is coupled to the external control connector 56 to provide SCSI control. To implement external control, the SCSI controller 18 is disabled by the external controller. When a device is coupled to the external control connector 56, a control signal is delivered from the external controller through the board-to-board connector 16 to disconnect the embedded SCSI controller 18 from the SCSI buses. Control of the bus switches 22, 24 and 26, as well as the terminators 34, 36, 38, 40, 50 and 52, is provided by the control logic 20.

As previously described, each of the drive connectors 42, 44, 46 and 48 has a SCSI device (not shown), such as a disk drive, coupled thereto. To implement each of the SCSI devices coupled to the drive connectors 42, 44, 46 and 48 under external control in a simplex mode in accordance with the present exemplary embodiment, the embedded SCSI controller 18 is electrically isolated from the SCSI devices. To electrically isolate the SCSI controller 18, the control logic 20 sets the bus switches 22 and 24 to an open state. By opening the bus switches 22 and 24, the buses to the SCSI controller 18 are disconnected, and control of the SCSI devices is implemented through the external control connector 56 and on channel B, exclusively. The bus switch 26 is set to a second state to connect the devices coupled to the drive connectors 42 and 44 to the SCSI bus on channel B. This configuration enables the external controller coupled to the external control connector 56 to control the devices coupled to each of the drive connectors 42, 44, 46 and 48 through a single channel. Accordingly, in the simplex mode, the external SCSI controller provides control of each of the four SCSI devices coupled to the drive connectors 42, 44, 46 and 48 through a single SCSI bus coupled to an external controller on a single channel (here, channel B).

As previously described, each end of the SCSI bus should be terminated. Accordingly, one end of the SCSI bus is terminated by enabling terminator 50 at the end of the single bus path. In the present exemplary configuration, terminators 34, 36, 38 and 40 are not implemented and are therefore disabled. The terminator 52 is also disabled such that the path to the external control connector 54 is open for control signals. As can be appreciated, the other end of the SCSI bus may be terminated externally. Because the present embodiment implements a simplex mode and a single external controller coupled to the external control connector 56, the external control connector 54 is illustrated as disabled. That is to say that there are no devices coupled to the external control connector 54. As can be appreciated, the topology illustrated in FIG. 5 provides for external control of the SCSI devices in a simplex mode of operation through a controller on channel B.

Figure 6:
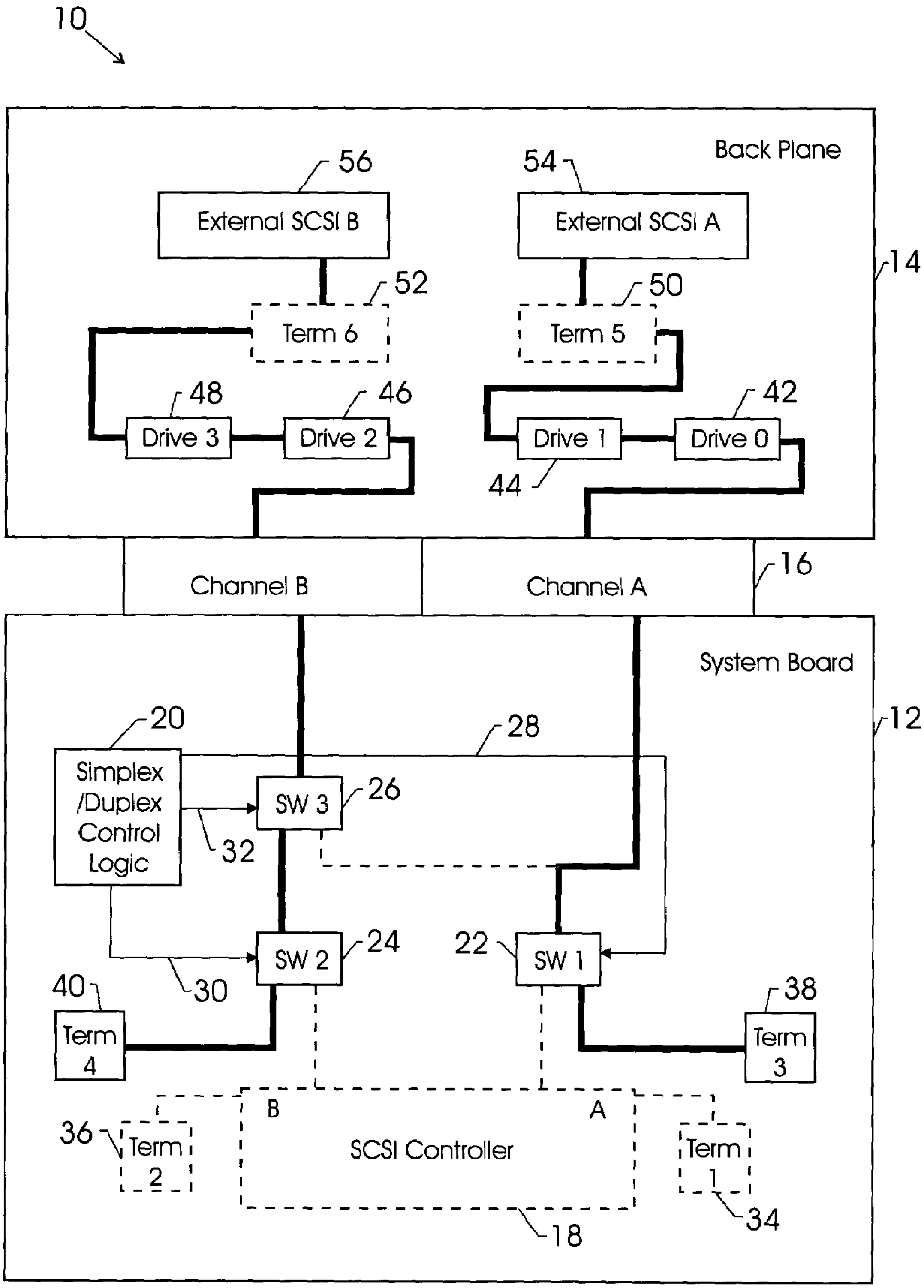
FIG. 6 is a block diagram illustrating an exemplary cableless duplex topology driven by external controllers coupled to a first channel and a second channel in accordance with embodiments of the present invention.

Cableless Duplex Topology Driven by External Controllers Coupled to Channels A and B Referring now to FIG. 6, a block diagram of an exemplary topology for implementing a SCSI duplex mode of operation driven by external SCSI controllers (not shown) is illustrated. In the present exemplary embodiment, a first external controller (not shown) is coupled to the external control connector 54 and a second external controller (not shown) is coupled to the external control connector 56 to provide SCSI control. To implement external control, the SCSI controller 18 is electrically isolated from the SCSI devices by the external controllers and the switches 22, 24 and 26. When controllers are coupled to the external control connectors 54 and 56, control signals are delivered from the external controllers through the board-to-board connector 16 to electrically isolate the embedded SCSI controller 18 by implementing the switches 22, 24 and 26. Control of the bus switches 22, 24 and 26, as well as the terminators 34, 36, 38, 40, 50 and 52, is provided by the control logic 20.

To implement each of the SCSI devices coupled to the drive connectors 42, 44, 46 and 48 under external control in a duplex mode the external control logic sets the bus switch 26 to a first state such that each of the SCSI bus channels (A and B) are isolated. Further, the bus switch 24 is set to a first state and the bus switch 22 is set to a second state. As illustrated in FIG. 6, this switch configuration eliminates the bus paths to the SCSI controller 18 and provides respective paths to terminators 38 and 40, such that each of the channels may be properly terminated. This configuration enables the external controller coupled to the external control connector 54 to control the devices coupled to drive connectors 42 and 44 and enables the external controller coupled to the external connector 56 to control the devices coupled to drive connectors 46 and 48. Accordingly, in the duplex mode, each of the external SCSI controllers provides control of two of the four SCSI devices coupled to the drive connectors 42, 44, 46 and 48 through a respective channel.

As previously described, each end of the SCSI bus should be terminated. Accordingly, one end of the SCSI bus on channel A is terminated by enabling terminator 38 at the end of the channel A bus path. Similarly, one end of the SCSI bus on channel B is terminated by enabling terminator 40 at the end of the channel B bus path. In the present exemplary configuration, terminators 34, and 36 are not implemented and are therefore disabled. The terminators 50 and 52 are also disabled such that the paths to the respective external control connectors 54 and 56 are open for control signals. As can be appreciated, the other end of each SCSI bus may be terminated externally. As can be appreciated, the topology illustrated in FIG. 6 provides for external control of the SCSI devices in a duplex mode of operation through channels A and B.

Cableless Duplex Topology Wherein an Embedded Controller Drives Channel A and an External Controller Drives Channel B.

Figure 7:
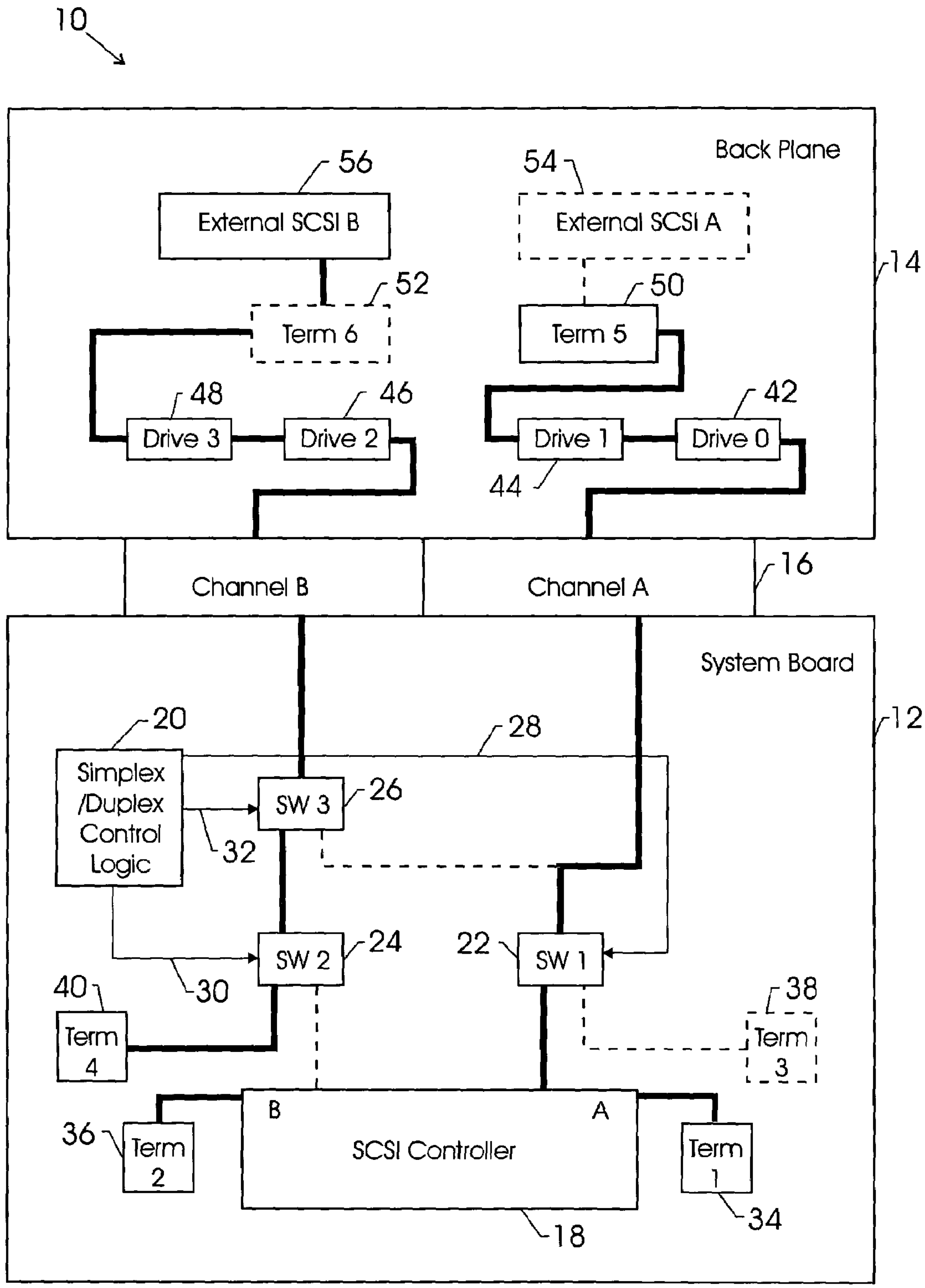
FIG. 7 is a block diagram illustrating an exemplary cableless duplex topology wherein an embedded controller drives a first channel and an external controller drives a second channel in accordance with embodiments of the present invention.

FIG. 7 is a block diagram illustrating an exemplary topology for a SCSI duplex mode of operation wherein the embedded SCSI controller 18 drives channel A and an external controller (not shown) drives channel B. In the present exemplary embodiment, an external controller (not shown) is coupled to the external control connector 56 to provide control of channel B. To implement external control, channel B of the SCSI controller 18 is electrically isolated by changing the state of the switches 24 and 26 when a device is coupled to the external control connector 56, as described further below. The control logic 20 controls the states of the bus switches 22, 24 and 26.

To implement each of the SCSI devices coupled to the drive connectors 42, 44, 46 and 48 in a duplex mode wherein channel A operates under the control of the embedded SCSI controller 18 and channel B operates under external control, the bus switch 26 is set to a first state such that each of the SCSI bus channels (A and B) are isolated. Further, the bus switch 24 is set to a first state to provide a termination path to the terminator 40, such that channel B may be properly terminated. Bus switch 22 is set to a first state to provide an open channel to the SCSI devices coupled to drive connectors 42 and 44. This configuration enables the embedded SCSI controller 18 to control the devices coupled to drive connectors 42 and 44 and enables the external controller coupled to the external connector 56 to control the devices coupled to drive connectors 46 and 48.

As previously described, each end of each SCSI bus should be terminated. Accordingly, one end of the SCSI bus on channel A is terminated by enabling the terminator 34 at the controller end of channel A, and enabling terminator 50 at the SCSI device end of the channel A bus path. Because no device is coupled to the external control connector 54, the external control connector 54 is illustrated as disabled. Similarly, one end of the SCSI bus on channel B is terminated by enabling terminator 40 at the end of the channel B bus path. The terminator 52 is disabled such that the path to the external control connector 56 is open for control signals. As can be appreciated, the other end of the SCSI bus for channel B may be terminated externally. In the present exemplary embodiment, terminator 38 is not implemented and may be disabled. Further, because the SCSI controller 18 is not implemented to control channel B, terminator 36 is enabled to properly terminate the channel. As can be appreciated, the topology illustrated in FIG. 7 provides for external control of the SCSI devices on channel B and embedded control of the devices on channel A through a duplex mode of operation.

Cableless Duplex Topology Wherein an Embedded Controller Drives Channel B and an External Controller Drives Channel A.

Figure 8:
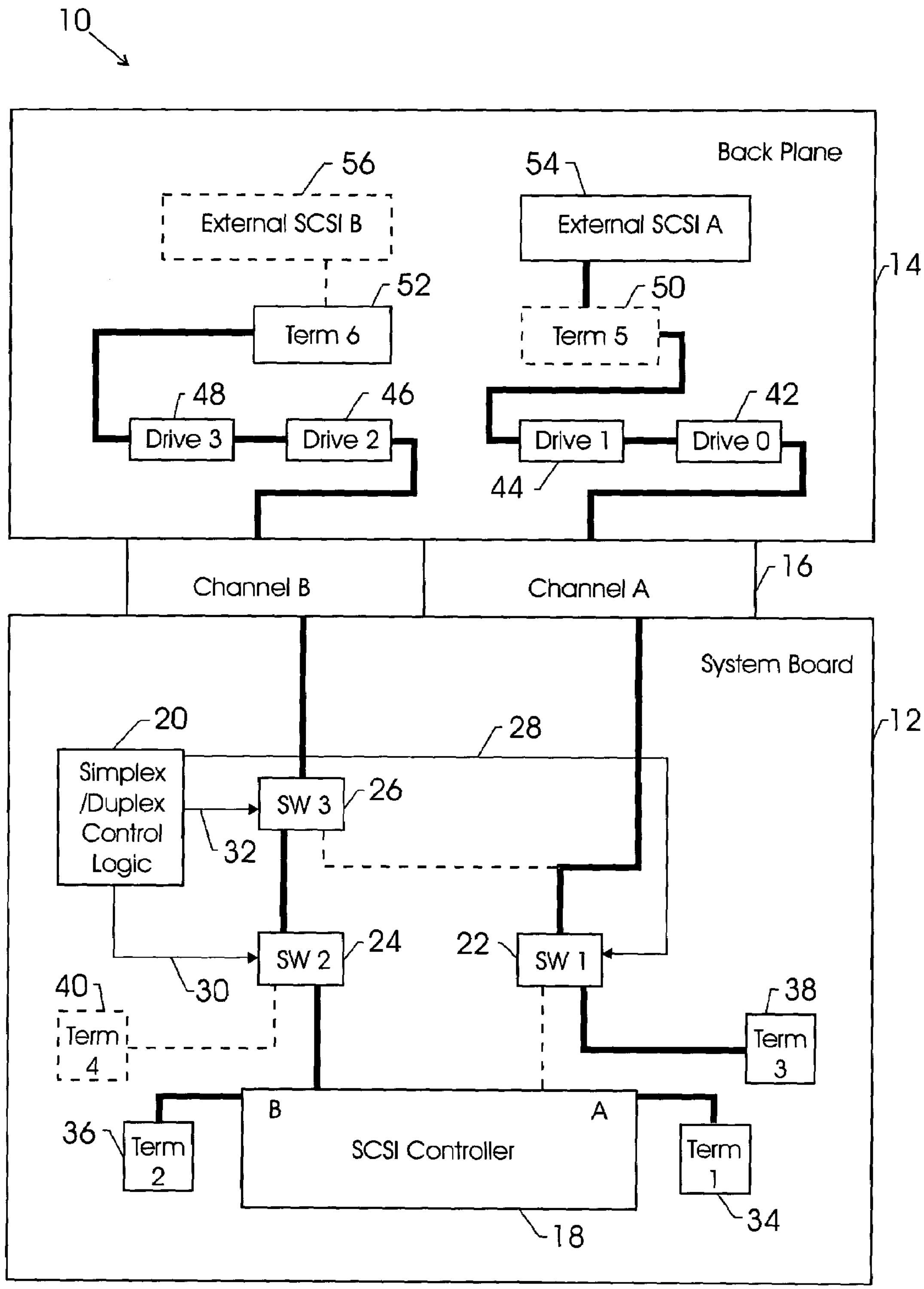
FIG. 8 is a block diagram illustrating an exemplary cableless duplex topology wherein an external controller drives a first channel and an embedded controller drives a second channel in accordance with embodiments of the present invention.

FIG. 8 is a block diagram illustrating an exemplary topology for a SCSI duplex mode of operation wherein the embedded SCSI controller 18 drives channel B and an external controller (not shown) drives channel A. In the present exemplary embodiment, an external controller (not shown) is coupled to the external control connector 54 to provide control of channel A. To implement external control, channel A of the SCSI controller 18 is electrically isolated by changing the state of the switches 22 and 26 when a device is coupled to the external control connector 54. The control logic 20 controls the states of the bus switches 22, 24 and 26.

To implement each of the SCSI devices coupled to the drive connectors 42, 44, 46 and 48 in a duplex mode wherein channel B operates under the control of the embedded SCSI controller 18 and channel A operates under external control, the bus switch 26 is set to a first state such that each of the SCSI bus channels (A and B) are isolated. Further, the bus switch 22 is set to a second state to provide a termination path to the terminator 38, such that channel A may be properly terminated. Bus switch 24 is set to a second state to provide an open channel from the embedded SCSI controller 18 to the SCSI devices coupled to drive connectors 46 and 48. This configuration enables the embedded SCSI controller 18 to control the devices coupled to drive connectors 46 and 48 and enables the external controller coupled to the external connector 54 to control the devices coupled to drive connectors 44 and 42.

As previously described, each end of each SCSI bus should be terminated. Accordingly, one end of the SCSI bus on channel B is terminated by enabling the terminator 36 at the controller end of channel B, and enabling terminator 52 at the SCSI device end of the channel B bus path. Because no device is coupled to the external control connector 56, the external control connector 56 is illustrated as disabled. Similarly, one end of the SCSI bus on channel A is terminated by enabling terminator 38 at the end of the channel A bus path. The terminator 50 is disabled such that the path to the external control connector 54 is open for control signals. As can be appreciated, the other end of the SCSI bus for channel A may be terminated externally. In the present exemplary embodiment, terminator 40 is not implemented and may be disabled. Further, because the SCSI controller 18 is not implemented to control channel A, terminator 34 is enabled to properly terminate the channel. As can be appreciated, the topology illustrated in FIG. 8 provides for external control of the SCSI devices on channel A and embedded control of the devices on channel B through a duplex mode of operation.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:

a system board comprising an embedded small computer system interface (SCSI) controller configured to provide cableless control in each of a simplex mode of operation and a duplex mode of operation and wherein the system board comprises a first channel bus and a second channel bus;

a backplane comprising a plurality of connectors configured to couple SCSI devices to the backplane; and a cableless element configured to couple the backplane to the system board and configured to facilitate the exchange of control signals and power signals between the system board and the backplane in each of the simplex mode of operation and the duplex mode of operation.

2. The system, as set forth in claim 1, wherein the system board comprises a mode control device adapted to configure the system to operate in one of the simplex mode of operation and the duplex mode of operation, in response to a request.

3. The system, as set forth in claim 2, wherein the system board comprises a plurality of switches coupled to the mode control device, wherein each of the plurality of switches is adapted to reconfigure at least one of the first channel bus and the second channel bus.

4. The system, as set forth in claim 1, wherein the system board comprises a plurality of terminators each configured to terminate at least one of the first channel bus and the second channel bus when the terminator is enabled.

5. The system, as set forth in claim 1, wherein the backplane comprises a plurality of drive connectors configured to couple disk drives to the backplane.

6. The system, as set forth in claim 1, wherein the backplane comprises a plurality of terminators, wherein each of the plurality of terminators is configured to terminate one of the first channel bus and the second channel bus when the terminator is enabled.

7. The system, as set forth in claim 1, wherein the backplane comprises external control connectors configured to couple external SCSI controllers to the backplane.

8. The system, as set forth in claim 1, wherein the cableless element comprises a board-to-board connector.

9. The system, as set forth in claim 8, wherein the board-to-board connector comprises a 200-pin connector.

10. A system comprising:

a small computer system interface (SCSI) system comprising a first bus channel and a second bus channel, wherein the SCSI system is configured to selectably operate in each of a simplex mode and a duplex mode without implementing cables, and wherein the SCSI system is configured to selectably implement each of a embedded SCSI controller and one or more external SCSI controllers; and one or more SCSI devices coupled to the SCSI system.

11. The system, as set forth in claim 10, wherein the SCSI system comprises:

a system board comprising an embedded SCSI controller;

a cableless element coupled to the system board; and a backplane coupled to the cableless element, wherein the one or more SCSI devices are coupled to the SCSI system through the backplane.

12. The system, as set forth in claim 11, comprising mode control logic configured to connect and disconnect each of the first bus channel and the second bus channel depending on whether the simplex mode or the duplex mode is selected.

13. The system, as set forth in claim 11, wherein the system board comprises a plurality of bus switches adapted to configure the first bus channel and the second bus channel depending on whether the simplex mode or the duplex mode is selected.

14. The system, as set forth in claim 11, comprising one or more external SCSI controllers coupled to the backplane.

15. The system, as set forth in claim 10, wherein the SCSI system comprises a plurality of terminators configurable to terminate the first bus channel and the second bus channel.

16. A system for implementing a simplex mode of operation and a duplex mode of operation, the system comprising:

a first small computer system interface (SCSI) channel comprising a first bus, wherein the first bus is coupled between an embedded SCSI controller on a system board and a first external control connector on a backplane;

a second small computer system interface (SCSI) channel comprising a second bus, wherein the second bus is coupled between the embedded SCSI controller on the system board and a second external control connector on a backplane; and wherein the backplane is coupled to the system board through a cableless element.

17. The system, as set forth in claim 16, wherein one or more SCSI devices are coupled to the first bus, and wherein one or more SCSI devices are coupled to the second bus.

18. The system, as set forth in claim 16, comprising a bus switch configured to couple the first bus to the second bus to form a single bus when the system is implementing a simplex mode of operation.

19. The system, as set forth in claim 18, wherein the embedded SCSI controller is coupled to the single bus at a point other than an end of the single bus.

20. The system, as set forth in claim 16, comprising a plurality of terminators each configured to terminate one of the first bus and the second bus.

21. The system, as set forth in claim 16, wherein the embedded SCSI controller comprises a first embedded SCSI controller coupled to the first bus and a second embedded SCSI controller coupled to the second bus.

22. The system, as set forth in claim 16, comprising a plurality of switches adapted to configure each of the first bus and the second bus depending on whether the simplex mode of operation or the duplex mode of operation is implemented, and depending on whether the embedded SCSI controller is implemented or one or more external SCSI controllers are implemented.

23. A small computer system interface (SCSI) system comprising:

means for cablelessly coupling a backplane to a system board; and means for configuring each of a first bus and a second bus in the SCSI system to operate in one of a simplex mode of operation and a duplex mode of operation.

* * * * *